Nov. 25, 1969  L. E. HARLIN  3,480,204
LUBRICATION SYSTEM FOR ROTARY COMPRESSOR
Filed March 26, 1968  2 Sheets-Sheet 2
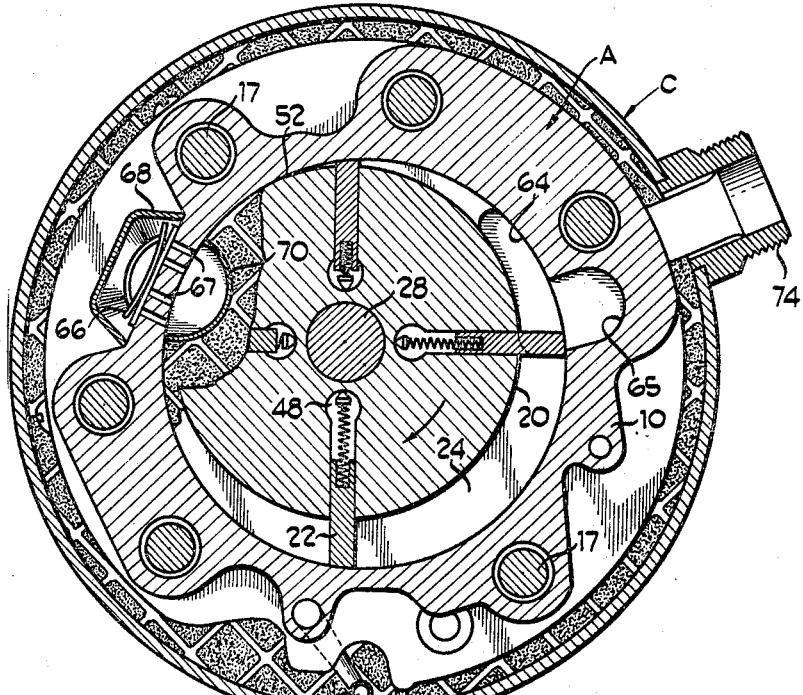
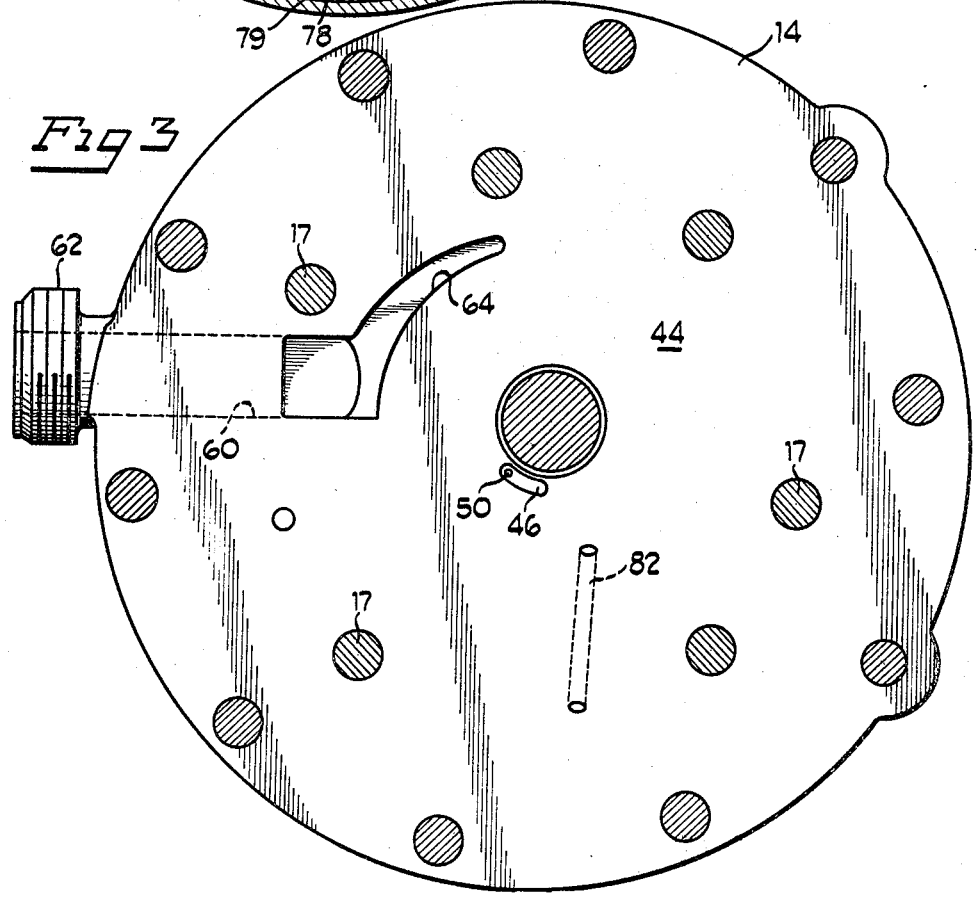

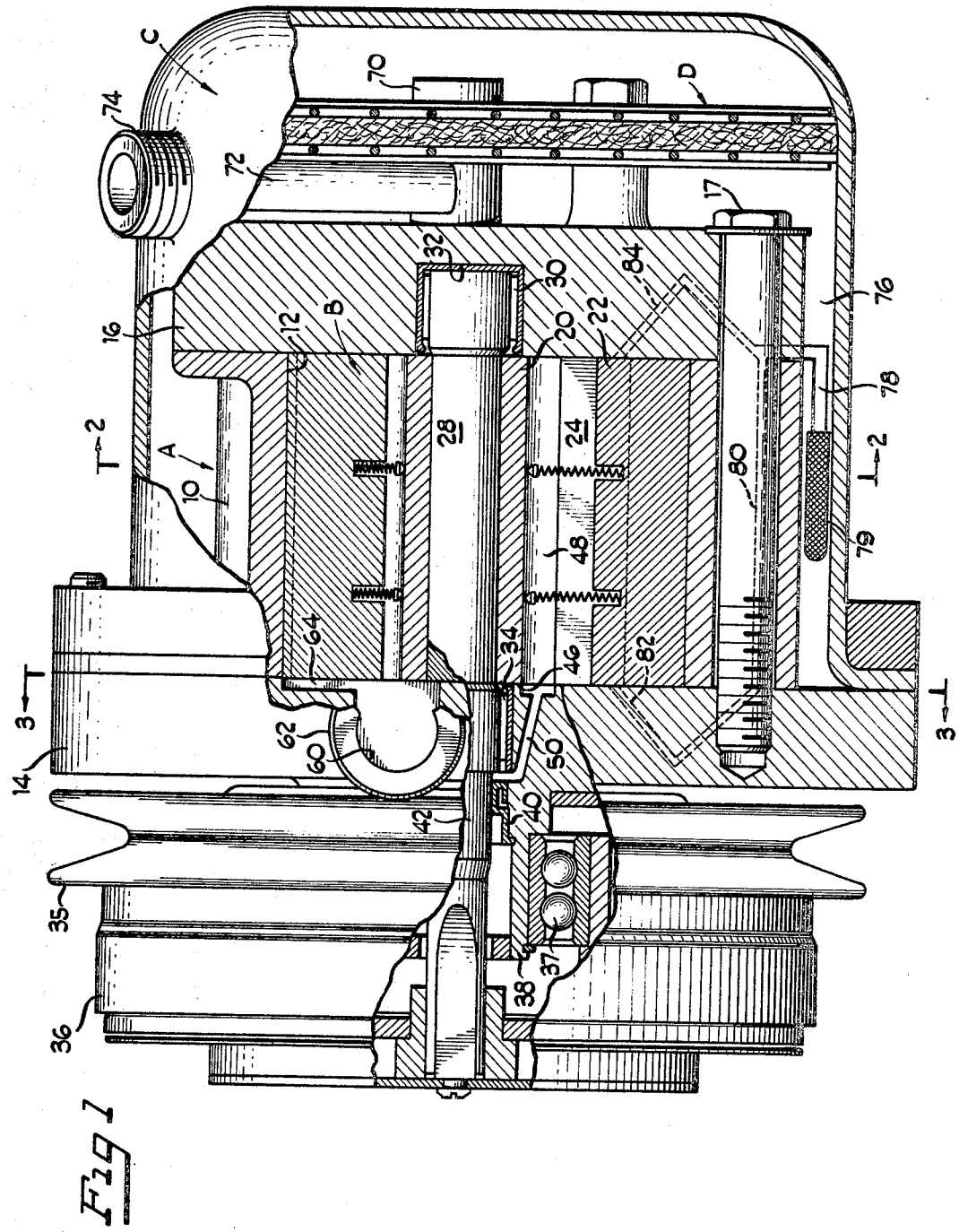

ns patentedUnitedStatesPatentOffice 3,480,204
Patented Nov. 25, 1969

3,480,204
LUBRICATION SYSTEM FOR ROTARY COMPRESSOR
Lester E. Harlin, York, Pa., assignor to Borg-Warner Corporation, Chicago, Ill., a corporation of Delaware
Filed Mar. 26, 1968, Ser. No. 716,066
Int. Cl. F04c 17/00, 29/02; F04b 39/02
U.S. Cl. 230—152                                        1 Claim

ABSTRACT OF THE DISCLOSURE

A lubrication system for rotary sliding vane compressors which is adapted to insure that the main shaft seal is readily supplied with sufficient lubrication under relatively low pressure. The bearing plate is provided with a recess which intermittently communicates with the under side of the vanes in the suction zone. A passage connects the recess to the space in which the main bearing and seal are located so that a low pressure condition is created in such space, causing oil to migrate into it.

BACKGROUND AND SUMMARY OF THE INVENTION

This invention relates generally to lubrication systems for rotary sliding vane compressors, and more particularly to improvements in the lubrication of the main shaft bearing assembly and associated seal.

One of the problems encountered in the design of rotary sliding vane compressors is the tendency of the lubricant to flow very rapidly from high pressure zones to low pressure zones within the compressor casing. As a result, there is no positive flow of oil to areas which are normally maintained under relatively high pressure. Some compressors heretofore known provide a positive pressure lubrication system for the main bearing and seal and maintain them at discharge pressure under practically all operating conditions. This has a disadvantage in that the seal is subjected to greater loads, causing wear and leakage.

In the present invention, a low pressure condition i.e., suction pressure, is induced in the space where the shaft bearing and an associated seal are located. During the migration of the oil from high pressure side to the low pressure side the suction condition induced in the vicinity of the bearing will cause sufficient quantities of oil to flow in and around the bearing and seal.

Another important feature of the invention is the particular manner in which the low pressure condition is created. Specifically, it is produced by allowing intermittent communication between the bearing cavity and the under side of the vanes while the vanes are moving radially outwardly.

It is therefore a principal object of the invention to provide an improved lubrication system for a rotary sliding vane compressor, particularly one which is adapted for use in a refrigeration system.

Another object of the invention is to provide a rotary sliding vane compressor which insures satisfactory lubrication of the main rotor shaft bearing and seal.

Still another object is to reduce the pressure on the seal—avoiding excessive wear and leakage caused by elevated pressures.

Additional objectives and advantages will be apparent from reading the following detailed description taken in conjunction with the following drawings.

DRAWINGS

FIGURE 1 is a side elevation view, with portions broken away in cross section, of the rotary compressor constructed in accordance with the principles of the present invention;

FIGURE 2 is a cross section view, with portions broken away, taken along the plane of line 2—2 of FIGURE 1; and FIGURE 3 is a view taken along the plane of line 3—3 of FIGURE 2.

DETAILED DESCRIPTION OF THE INVENTION

Referring now to the drawings and more particularly to FIGURE 1, the compressor constructed in accordance with the principles of the present invention comprises a housing A containing the rotor assembly B, and a shell C surrounding the compressor and attached to the front bearing plate which constitutes one part of the housing.

The compressor housing A includes a casing 10 having a cylindrical bore 12 extending therethrough, a front bearing plate 14, and a rear bearing plate 16 all secured by capscrews 17. The rotor assembly B is received within the cylinder 12 and includes a slotted rotor 20 which carries a plurality of substantially radially extending and reciprocating vanes 22. This axis of rotor 20 is offset or eccentrically arranged with respect to the axis of the bore 12 so that the bore, the front bearing plate 14, the rear bearing plate 16, and the rotor 20 cooperate to provide a crescent-shaped compression chamber or cavity 24. The rotor 20 is connected to, or made integral with a drive shaft 28 which is journalled in a bearing 30 supported by the rear bearing plate 16 in recessed portion 32 and a bearing 34 supported by the front bearing plate 14.

Inasmuch as the preferred embodiment is especially adapted for automotive use, the compressor rotor is driven by a V-belt pulley 35 through a conventional electromagnetic clutch assembly 36. Pulley 35 is rotatably journalled on a bearing 37, the inner race of which is carried on an axial extension 38 of the front bearing plate 14 and arranged for driving connection with the engine fan belt or accessory drive belt (not shown). The front bearing plate extension 38 is provided with a seal 40 engaging a boss 42 on the drive shaft to prevent loss of refrigerant and lubricant through the front plate journal bearing.

An important aspect of the present invention is the lubrication system which assures that the oil or other lubricant is continuously supplied to the rotor shaft bearing and the seal. As pointed out earlier, the problem of maintaining the bearing and seal lubricated is caused in part by the relationship of pressures across the rotor faces. On the discharge side of the rotor, in the vicinity of the discharge valve, gas pressure is at a much higher level than at the suction side. Under some conditions, this differential can be as much as 300 p.s.i. Consequently, oil tends to flow directly across the rotor faces any bypass the intermediate area where the bearing and seal are located.

Referring now to FIGURE 3, the face 44 of the front bearing plate 14 is provided with an elongated slot or recess 46 which is adapted to communicate with the space 48 (FIGURE 2) underneath the vanes 22 as they pass through the suction zone. This recess communicates through a passage 50 to the counter bore which supports the rotor shaft bearing and seal.

As the rotor travels in the direction shown by the arrow in FIGURE 2, the vanes 22 will move radially outwardly until they reach a point opposite the contact point 52 and then begin traveling radially inwardly until they reach the contact point. During the outward travel, the volume under each vane is expanding thereby creating a low pressure condition which draws oil (and any vapor flowing with the oil) into the volume underneath the vane. It can be seen, therefore, as the vane passes the recess during its outward movement it will draw oil from around the bearing and seal through passage 50 and recess 46. As the vane passes beyond the recess, this oil (and some vapor) are trapped and pass to the suction side of the compressor along the major area of the vanes and through the clearances along the rotor faces.

In operation, suction gas from the vaporator (not shown) is fed into a passage 60 in the front bearing plate 14. The external fitting 62 being adapted to connect with the suction gas line. Passage 60 communicates with a pair of kidney-shaped recesses 64 provided in the front and rear bearing plates to feed the gas into the suction stage of the compression cavity 24. The two recesses are fluidly connected by a channel 65 formed in the casing 10.

The gas is discharged through a valve assembly 66 by way of ports 67 in the casing. The gas flows in a channel provided by cover 68 into a tube 70 fitted to the end of the cover, said tube extending toward the end of shell C through an oil separator D. Discharge gas flows out through a discharge line 72 which is connected to discharge line fitting 74. The details of the discharge valve assembly and the oil separator are not believed to be necessary for a complete understanding of the present invention.

In operation, the oil collects in the sump portion 76 at lower part of the shell C. Since discharge gas pressure is acting on the surface of the oil, it is forced into an oil pick-up tube 78 having a strainer 79. The pick-up tube feeds oil through a series of passages in the casing and bearing plates. Passage 80 extends through casing 10 and communicates with passage 82 in the front bearing plate 14 and 84 in the rear bearing plate 16. Oil is fed against the faces of rotor 20 to lubricate and provide a gas seal.

While this invention has been described in connection with a certain specific embodiment thereof, it is to be understood that this is by way of illustration and not by way of limitation; and the scope of the appended claim should be construed as broadly as the prior art will permit.

What is claimed is:

1. A rotary compressor comprising a casing having a compression cavity provided therein; a bearing plate forming one side wall of said compression cavity; a bearing supported by said bearing plate; a rotor assembly adapted to compress a gaseous fluid in said compression cavity, said rotor assembly including a rotor and a shaft operatively connected thereto journalled in said bearing; a seal around said shaft; means defining at least one radially extending slot in said rotor; a vane received in said slot adapted to reciprocate in a generally radial direction, said vane moving outwardly during the suction stage and inwardly during the compression stage; and means defining a lubricating liquid passage in said bearing plate providing intermittent lubricating liquid communication between a first space where said bearing and seal are located and a second space underneath said vane between said shaft and the radially inner end of said vane, said intermittent lubricating liquid communication occuring during movement of said vane outwardly, whereby a low pressure condition is created in said first space.

References Cited

UNITED STATES PATENTS

| | | | |
|---|---|---|---|
| 2,093,188 | 9/1937 | Deming | 230—151 |
| 2,498,972 | 2/1950 | Whiteley | 230—152 |
| 2,827,226 | 3/1958 | McCormack | 230—152 |
| 3,258,198 | 6/1966 | Harlin | 230—152 X |
| 3,312,387 | 4/1967 | Cassidy et al. | 230—152 |
| 3,385,513 | 5/1968 | Kilgore | 230—207 X |
| 3,412,685 | 11/1968 | Connelly | 103—136 |

DONLEY J. STOCKING, Primary Examiner

W. J. KRAUSS, Assistant Examiner

U.S. Cl. X.R.

103—136; 230—203, 207